Figure 1:
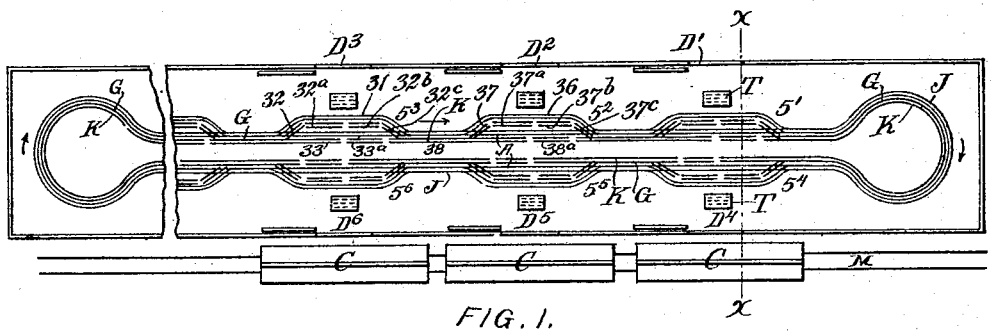

R. C. WELLER, P. D. NAUGLE & S. T. HYDE.
TRUCKING SYSTEM.
APPLICATION FILED NOV. 4, 1912.

1,213,317.

Patented Jan. 23, 1917.
4 SHEETS—SHEET 1.

SECTION X-X

R. C. WELLER, P. D. NAUGLE & S. T. HYDE.
TRUCKING SYSTEM.
APPLICATION FILED NOV. 4, 1912.
1,213,317.
Patented Jan. 23, 1917.
4 SHEETS—SHEET 2.
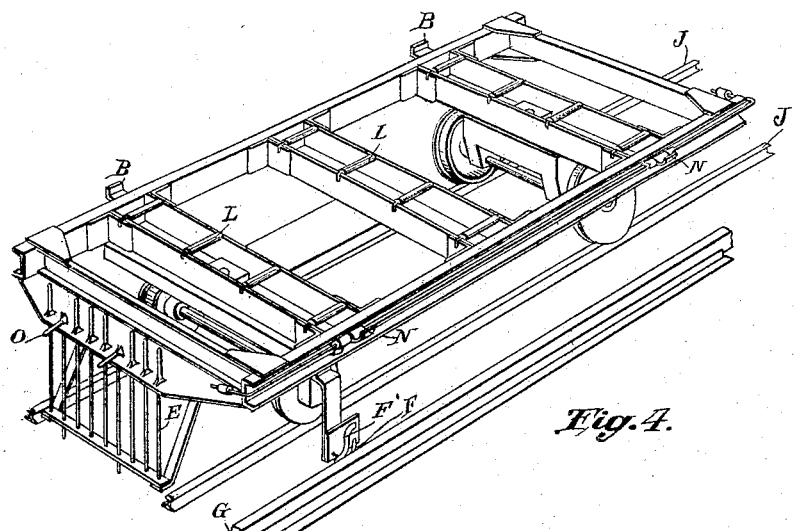
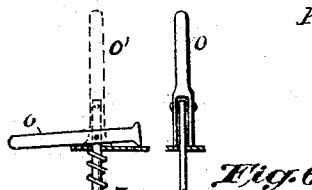
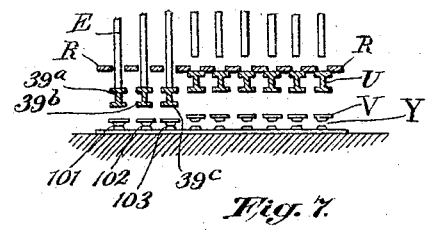
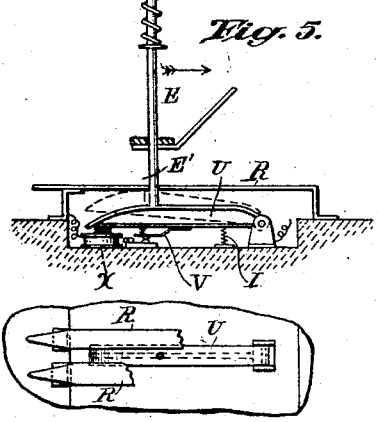
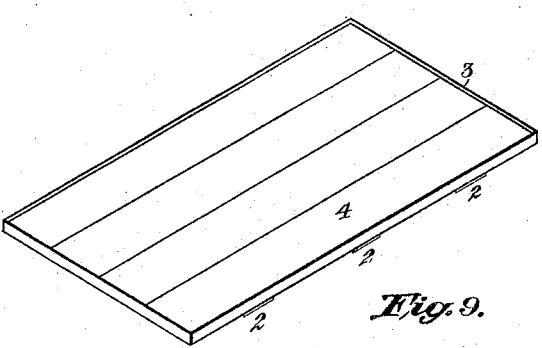

R. C. WELLER, P. D. NAUGLE & S. T. HYDE.
TRUCKING SYSTEM.
APPLICATION FILED NOV. 4, 1912.

1,213,317.

Patented Jan. 23, 1917.
4 SHEETS—SHEET 3.

WITNESSES:

INVENTORS
Robert Carleton Weller
Philip Daniel Naugle
Stanley Taber Hyde

R. C. WELLER, P. D. NAUGLE & S. T. HYDE.
TRUCKING SYSTEM.
APPLICATION FILED NOV. 4, 1912.
1,213,317.
Patented Jan. 23, 1917.
4 SHEETS—SHEET 4.
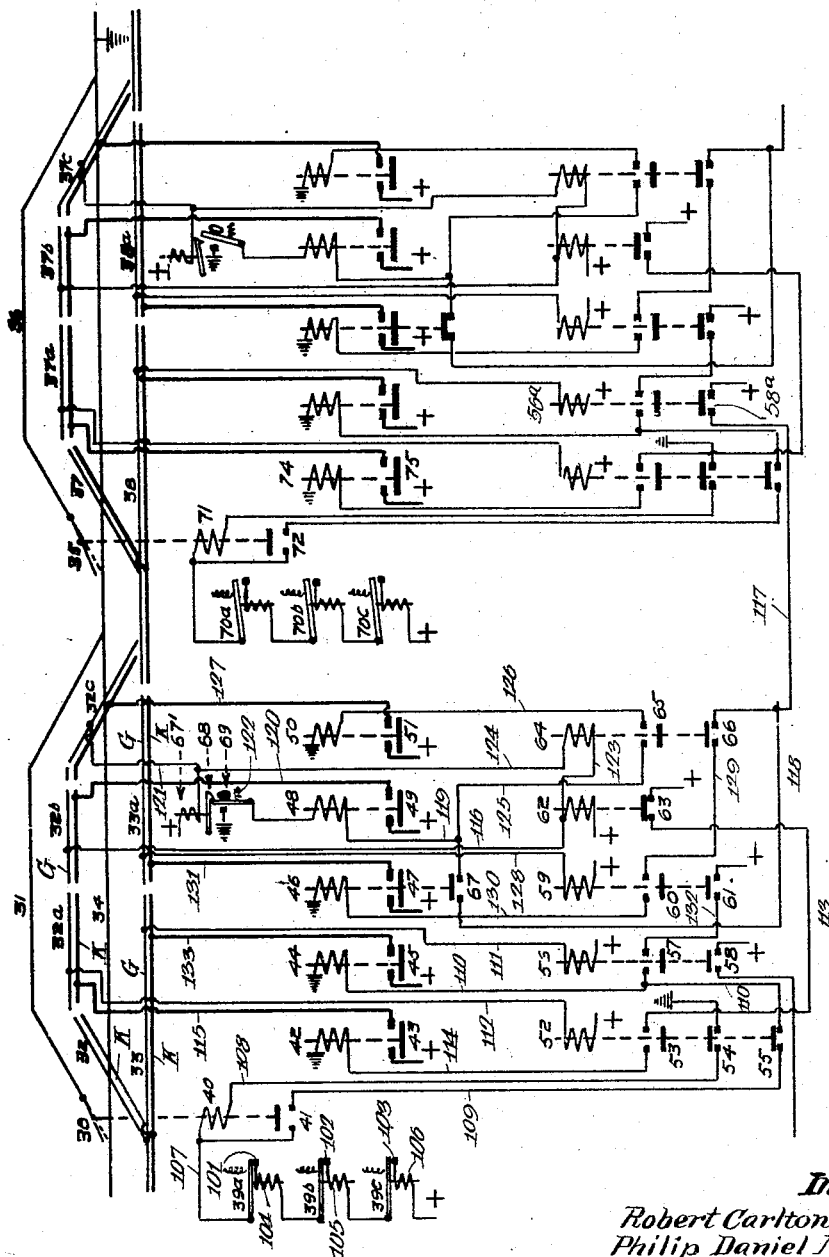
Inventors:
Robert Carlton Weller,
Philip Daniel Naugle,
Stanley Taber Hyde.
By:
Att'y.

UNITED STATES PATENT OFFICE.

ROBERT CARLETON WELLER, OF CHICAGO, ILLINOIS, AND PHILIP DANIEL NAUGLE AND STANLEY TABER HYDE, OF BREMERTON, WASHINGTON.

TRUCKING SYSTEM.

1,213,317.   Specification of Letters Patent.   Patented Jan. 23, 1917.

Application filed November 4, 1912. Serial No. 729,189.

*To all whom it may concern:*

Be it known that we, ROBERT C. WELLER, residing at 337 South Normal Park Way, Chicago, in the county of Cook and State of Illinois, and PHILIP D. NAUGLE and STANLEY T. HYDE, residing at Bremerton, in the county of Kitsap and State of Washington, citizens of the United States, have invented a new and useful Trucking System, of which the following is a specification.

Our invention relates to the trucking of bales, bundles, barrels, packages, boxes, etc. (now in general use in the merchandising trade of the United States) in warehouses and to the trucking of freight, both that commercially designated as carload freight and that commercially designated as less-than-carload freight, at freight depots. It, however, relates particularly to the trucking of less-than-carload freight at inbound, outbound and transfer freight depots or stations. This conveying at the present time, when done by the use of trucks, is accomplished by trucks pushed or pulled manually; or by trucks, propelled by electricity or internal combustion engines, whose control is effected manually.

The specific objects of our invention are: first, to provide an electrically propelled truck suitable for the purposes of conveying articles as described in a general way above; second, to provide a system of tracks on which the trucks can move from point to point; third, to provide a system for automatically controlling and directing the movements of the trucks without any possibility of collision or delays; fourth, to provide facilities for the quick loading and unloading of the trucks, thus facilitating their movement; fifth, to provide facilities for conveying articles into cars, or to and from points not immediately adjacent to the tracks of the automatic system; sixth, by use of the apparatus mentioned in the immediately foregoing, to handle freight more rapidly and at less cost than present methods, previously mentioned above, permit.

Figure 2:
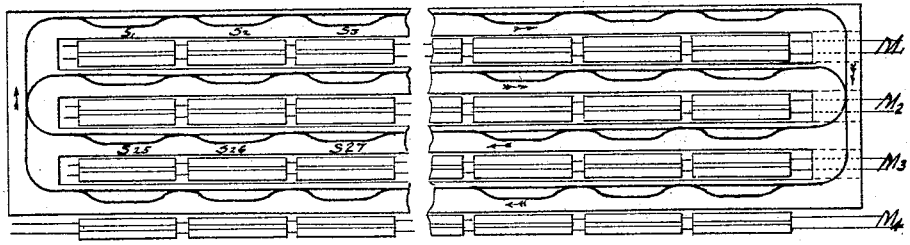
Figure 3:
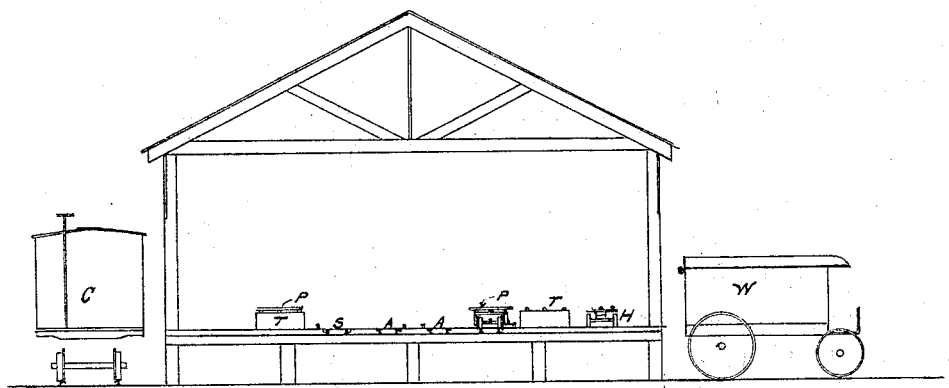
Figure 10:
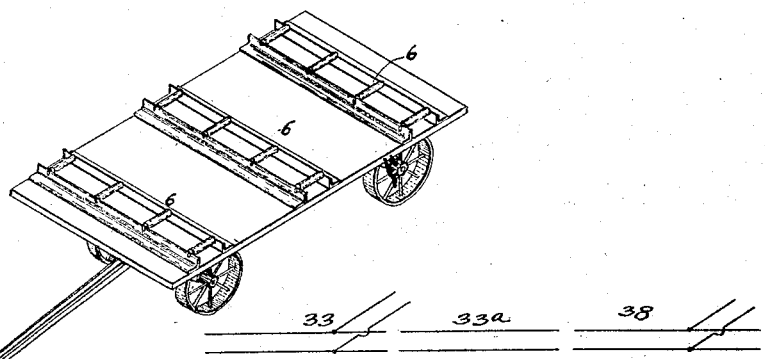
Figure 13:
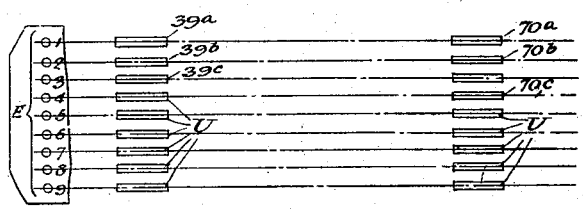
Figure 11:
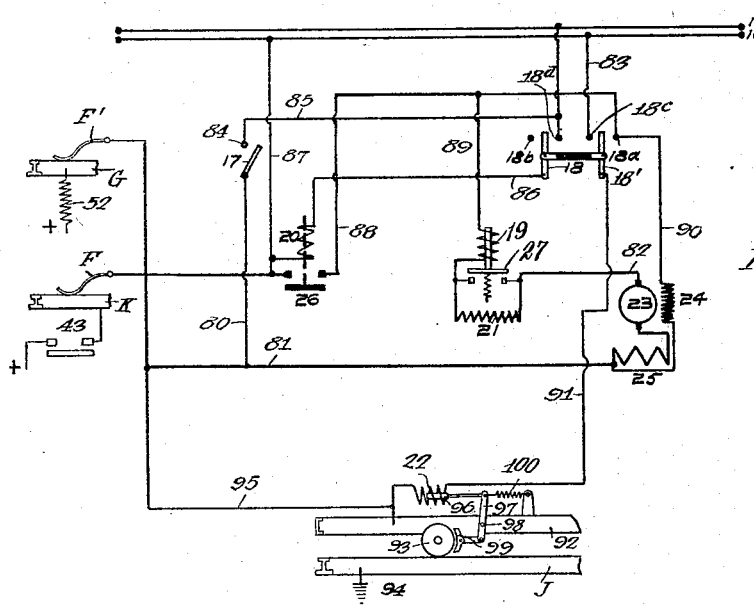

We attain these objects by the mechanism illustrated in the accompanying drawings, in which:

Figure 1 is a plan of the tracks, as for instance, applied to an outbound freight station; Fig. 2, a plan of the tracks as, for instance, applied to a railroad transfer station; Fig. 3, a vertical section of a typical outbound freight station showing the relative position of the component parts of the system. (See section "$x$—$x$" in Fig. 1). Fig. 4 is a view of the automatic truck showing the original features of the truck and the controlling apparatus or selector pins; Fig. 5, a side view of one complete selector pin and contactor showing the method in which the selector pins on the truck establish electric contacts, thereby throwing the switches and spacing or blocking the trucks; Fig. 6, an end elevation of the selector pin mechanism only; Fig. 7, a cross section of the lower end of three selector pins and of the selector pin guides, the cam contactor and the contacts; Fig. 8, a plan of the cam contactor and the selector pin guides; Fig. 9, a view of a truck top or platform; Fig. 10 is a view of a hand truck used in manually trucking articles to points not adjacent to the tracks; Fig. 11, a diagram of the electrical equipment of a single truck or of a train of trucks; Fig. 12, a full electrical diagram of the wiring and electrical apparatus necessary to operate two sidings and the adjacent main track. Fig. 13 shows in diagrammatic plan view the relation of the selector pins carried by the truck to the electric switching mechanism operated thereby.

Similar letters refer to similar parts throughout the several views.

The system of tracks necessary for the operation of our system in an outbound freight house is given in Fig. 1 as an illustration. At doors, as $D^1$, $D^2$ and $D^3$, freight is received from wagons as W (Fig. 3) for conveyance to the cars C. When ready for forwarding it is either placed on trucks standing on sidings as $S^1$, $S^2$ or $S^3$, or is placed on truck tops (Fig. 9) resting on tables T. Tables T and both the automatic trucks (Fig. 4) and the hand trucks (Fig. 10) are similarly equipped with steel rollers L (Fig. 4) or 6 (Fig. 10) which bear against steel plates 2 (Fig. 9) fastened to the under side of oak boards 4 (Fig. 9) and to the steel flange 3 (Fig. 9). This enables loaded or empty truck tops to be easily pushed from the trucks to the tables or vice versa. The tables are provided for two reasons which are now stated. In an outbound freight house, as in most warehouses, the volume of business is greater at some particular period of the day than at any other. Unless extra facilities are provided to care for the additional business, congestion results. The first reason for providing these tables, then, is to provide a suitable place where, should all the automatic trucks assigned to that particular door be busy, loading can proceed uninterrupted by loading truck tops placed on these tables. When an automatic truck returns this load can then be pushed very easily and quickly onto it for immediate conveyance to the outbound cars and the empty truck top, removed from the returning automatic truck, can be placed on the tables for a repetition of the process. The second reason is to lessen the necessity of placing the freight on the platforms which not only congests them but also requires that the freight be handled again from the platforms to the trucks. These tables may or may not be used at warehouses or at freight transfer stations depending on the character of the business to be handled.

As previously stated our system consists of a number of tracks and trucks which are to be run independently or in trains. No new features are presented concerning the track itself and consequently a description of it is omitted; presumably the usual shaped T rails connected by wooden or steel ties will be used, but neither are essential requisites. The trucks are equipped with electric motors, are controlled automatically in all their movements, and are of the general type of construction shown in Fig. 4. The frame is built of steel channels, angles, and plates and rests on the axles of flanged wheels which run on the rails, J. A magnetic brake of a common type may be employed as shown diagrammatically in Fig. 11. When the truck top is pushed onto the truck it moves transversely across it on the rollers, L, until it is stopped by the lugs, B, at which time it is secured on the other side by the spring latches, N.

The general construction features of the truck in themselves are not the vital ones, so far as this application is concerned, and for this reason they are briefly treated. The motor and brake mechanism is omitted for the same reason.

The current is furnished to the truck by a double third rail or by a double overhead trolley wire. As the cases are exactly similar, consideration here will be only of that using a double third rail, G and K, Fig. 4, representing the two component wires or rails as they are hereinafter called. One of these rails supplies current to the motor and the other supplies current to the automatic blocking and control system. The rail supplying power to the motor is connected directly with the positive (+) side of the current supply and the current is taken from this to the motor circuit of the truck through contact shoe, F, Fig. 4, attached to the truck. The blocking third rail is connected through the coil of a relay to the positive (+) side of the current supply and is grounded through the truck frame by another shoe, F', Fig. 4. The truck may be equipped either with a direct current compound motor, or with a single phase induction motor with commutator. In the latter case the third rail supplying current to the motor carries single phase alternating current while the control third rail can carry either single phase alternating current or direct current, the operation of the complete system in all cases being identical. The working of the automatic blocking and control system in all cases, and in a way to meet all emergencies, will be seen in the detailed description which follows: The trucks and blocking system are so wired and so arranged that the trucks may be run in trains of two or more trucks and still be controlled as a single unit.

In Fig. 11 there are shown diagrammatically the circuit connections and electrical equipment of each truck. There are also shown diagramatically in this figure parts of the truck construction and the electrical connections by which the truck circuits are supplied with current. It will be understood, in connection with all of the electrical equipment shown and described that current is supplied from a suitable source and that, as far as the present invention is concerned, it is immaterial whether said source is a generator or a battery. It will further be understood that for the sake of clearness the plus sign (+) is employed throughout the diagrammatic showing of the circuits to indicate the positive conductor connected with the source of current and that the ground indication is employed to indicate connection with the negative terminal of the source of current, which preferably is grounded. As shown in Fig. 11, the truck is equipped with coupling conductors 15 and 16 which are used for connecting the electric circuits of the several cars comprising a train when said cars are connected together and it is desired to control them as a single unit. The conductor 15 is used as a block control conductor and the conductor 16 as a motor coupling conductor and it will be understood that suitable electrical connecting devices, not shown, are employed for rendering the conductors 15 and 16 continuous throughout a train where several cars are connected together. The switch 17 is a master switch for controlling the operation of the motor mechanism of the truck or train and is connected by wire 80 with wire 81, which, in turn, is connected to one terminal of the series field winding 25 of the motor and to one terminal of the shunt field winding 24 of said motor. The armature 23 of the motor has one of its brushes connected with the other terminal of the series field winding 25 and the other brush of said armature is connected by wire 82 with one of the contacts 27 of the starting solenoid or magnet 19. The contact 84 of the switch 17 is connected by wire 85 with the contact 18ᵈ of switch 18 and also with the control conductor 15. The switch 18 is provided with an open contact 18ᵇ and the pivotal point of said switch is connected by wire 86 with one terminal of the winding 20 of the electro-magnet or solenoid to control the starting of the said motor, the other terminal of said winding being connected by wire 87 with the control conductor 16 and with the contact shoe F resting upon the third rail K. The third rail K is connected with one of the contacts 43, the other of which contacts is connected with the positive terminal of the source of current supply. The magnet or solenoid 20 is provided with contacts 26 connected respectively with wire 87 and wire 88, the latter being also connected with the contact 18ᵃ of switch 18' and by wire 89 with one terminal of the winding 19 of the starting solenoid or magnet, the other terminal of which winding is connected with the other one of the contacts 27.

A starting resistance 21 has its terminals connected with the contacts 27. The switch 18' is provided with an alternate contact 18ᶜ connected by wire 83 with the control conductor 16 and the contact 18ᵃ is connected by wire 90 with one of the terminals of the shunt field winding 24. The pivotal point of the switch 18' is connected by wire 91 with one terminal of the brake solenoid 22, the other terminal of which is connected with the frame 92 of the truck and in turn with the wheel 93, the rail J, to ground 94. The wire 81 is connected by wire 95 with the frame 92 and with the contact shoe F' resting upon the third rail G, which rail is in turn connected with a relay winding or windings, one of which 52 is shown, the other terminal of said winding being connected with the positive conductor extending from the source of current supply. It will be understood that the third rail G has a number of different relay windings connected to it throughout the different sections of said rail and that the third rail K has connected to it a number of pairs of contacts also depending upon the number of sections of said third rail and that the relay winding 52 and the contacts 43 shown in Fig. 11 are merely illustrative of one particular condition of circuit connections which is duplicated at different points throughout the system, depending upon the number of switches employed. The brake solenoid 22 may operate any desired form of electromagnetic brake, the one shown in Fig. 11 being merely for purposes of illustration and forming no part in and of itself of the present invention. The construction diagrammatically shown consists of a core 96 connected with the upper end of a lever 97, pivotally supported at 98 upon the frame 92 and connected at its lower end with a brake shoe 99, which is held against the wheel 93 by a spring 100 when the solenoid 22 is not energized. The switches 18 and 18' are connected together for convenience by an insulating bar so that both may be moved together to engage either the contacts 18ᵇ and 18ᶜ or 18ᵈ and 18ᵃ as desired.

As a result of the circuit connections described with the switches 18 and 18' in their intermediate position, it is impossible to start the car, since the brake 99 is set and the motor circuit cannot be completed. To start the car the switches 18 and 18' are moved to their right-hand position into engagement with the contacts 18ᵈ and 18ᵃ respectively, which, however, in and of itself, does not close the operating circuits of the motor nor does it release the brake. To operate the car by the master switch 17, it is necessary that the car shall be upon a live section, or in other words that the third rail section K upon which the contact shoe F rests is supplied with positive current, which is the case when the contacts 43 are closed in a manner to be described. With the switch 17 in its closed position, current flows through the following circuit: from the source, contacts 43, third rail K, contact shoe F, winding 20, wire 86, switch 18, contact 18ᵈ, wire 85, contact 84, switch 17, wire 80, wire 95, frame 92, wheel 93, rail J, to ground 94, and thus back to the source. The solenoid 20 is thus energized and the closing of contacts 26 causes current to flow through the following path: from the source, contacts 43, third rail K, contact shoe F, contacts 26, wire 88, wire 89, solenoid 19, starting resistance 21, wire 82, armature 23, field winding 25, wire 81, wire 95, frame 92, and thus to ground and back to the source. At the same time that the last circuit traced is closed, current flows from wire 88, through contact 18ᵃ, switch 18', wire 91, solenoid 22, to frame 92, and thus to ground and back to the source, energizing the solenoid 22 and releasing the brake 99, against the action of the spring 100 and at the same time the shunt field winding 24 is energized by current flow from wire 88, wire 90, shunt field winding 24, wire 81, wire 95, frame 92 and thus to ground and back to the source. As a result of the circuits traced, the brakes are released and the motor is started. The starting magnet or solenoid 19 is so constructed that when the current flowing through its winding drops to a certain predetermined amount, the contacts 27 are closed thus short-circuiting the starting resistance 21 and throwing full current onto the motor. In this we have a current limit automatic starter. In case we use a single phase commutator type induction motor, the contactor, 19—27, and the resistor, 21, are not used. Switches, 17 and 18, are kept in their closed normal position at all times as the entire control of the truck is carried out through the blocking system as applied to the tracks. However, in case it is desired to hold a truck on a live track, it is then necessary to open the switch, 17.

When it is desired to move the truck a short distance on a live section of third rail K, in order to release the brake the switch 18' must be moved to the left into engagement with the contact 18°, which closes the following circuit: from the source, contacts 43, third rail K, contact shoe F, wire 87, control conductor 16, wire 83, contact 18°, switch 18', wire 91, solenoid 22, frame 92, and thus to ground and back to the source, which releases the brake as above described, in which condition the truck may be pushed by hand any distance.

It will be observed that if several cars are connected together to form a train, the closure of the master switch 17, (assuming that all of the switches 18 and 18' are in their right hand position) connects the control conductor 15 to ground through the wires 85, 80, 81 and 95 and that, therefore, the circuit of the solenoid 20 is completed for each of the cars in the manner above described producing the same result upon each car as above described for the car shown in Fig. 11. Furthermore, the control conductor 16 supplies positive current to all of the cars so that the movement of the switch 18' to the left on any car releases its magnetic brake as above described for the car shown in Fig. 11.

To run two or more trucks in a train, the trucks are coupled mechanically in the ordinary way and the electric connections are made through conductors, 15 and 16, Fig. 11, running through the truck, connected with the truck equipment as shown in Fig. 11, and provided with proper coupling sockets at both ends. If the trucks be connected through these, the whole train may be controlled as one unit by means of the operating switch, 17, on any one of the trucks; the conductor, 15, connects with the control of each truck and the conductor, 16, with the motor circuit and consequently all the trucks are thrown in multiple.

On the rear of each truck nine pins, E, Fig. 4, are arranged to be raised or lowered by individual levers, O. At E and U, Fig. 5, one contactor pin is shown depressing a cam contactor. This occurs when a truck passes over the track switch selective contactors. These contactors are operated as shown by Figs. 5, 6, 7 and 8.

E is the selector pin on the truck; R, the guides for the selector pin; V, the contacts; I, a compression spring to hold U in normal position; X, a solenoid for holding U in contact position. The guides, R, are secured to the track bed in such a way as to always bring the contactor pins directly over their respective cam contactors. They are arranged in a set of nine, and are placed in the track bed somewhere near the track switch they are to operate. It will be understood that but three (3) of the cam contactors are operative at any time for the embodiment of the system herein described for the operation of a track switch, but to provide for the possibility of changing the effective combinations of cam contactors at the several track switches of the system, to meet possible changes in the system, it is desirable to provide a complete set of nine cam contactors at each track switch. For example, new track switches may be added to the system from time to time with the result that it may be desirable to change the three cam contactors employed to operate one or more of said switches from one combination to another. However, only three of these are used at each point, the three being picked out and connected in a predetermined combination, no two combinations being alike on any of the track switches providing such an arrangement is desired. The contactor pins on the truck are lowered in combinations of three and are set to correspond to the combination of selective contactors at the switch to which it is desired to send the truck. Each track switch is operated by a solenoid whose electrical circuit is closed by these three contacts in series. It should be noted here that it is not imperative to use combinations of three. This number was selected merely as being fully illustrative of the principles involved.

In Fig. 12 is given a full electric diagram of two sidings and the adjacent main track. This shows the contacts and solenoids for throwing the track switch and the release, the relays for blocking, the solenoid switches for energizing the motor section of the third rail, and the hand switch with relay release for starting the trucks when the latter are on the loading sections of the siding. The control third rail is always alive and is connected through the control relay as heretofore explained, but the power third rail is normally dead and is energized only when a truck is on that section and is making contact with the control third rail. Even then the motor section cannot be energized unless the block section ahead is clear.

The control and blocking relays are shown in the lower part of this diagram and the solenoid switches supplying current to the motor third rail are shown just above the relays. In Fig. 12, 34 is the main track; 31 and 36, the sidings; 30 and 35, track switches operated by solenoids, 40 and 71, respectively; the blocking sections of the third rail, 33 and 33ª, are on the first section of the main track; 32, 32ª, 32ᵇ, and 32ᶜ on the siding of the first section; 37, 37ª, 37ᵇ, and 37ᶜ, on the siding of the second section of the track. The operation is further described from now on by means of concrete examples, this being the easiest manner in which the subject can be handled.

Assuming the main track to be clear and the sidings unoccupied, the several relays employed to control the operation of the car for each siding are deënergized and their contacts are in the following condition: Each third rail G is divided into a number of sections for each siding as shown for the siding 31 at 32ª and 32ᵇ and the relay 52 connected with the section 32ª is provided with normally open contacts 53 and normally closed contacts 54 and 55. The relay 62 connected with the section 32ᵇ is provided with normally closed contacts 63. The third rail G for the main track is divided into sections 33 and 33ª connected with relays 56 and 59 respectively, the relay 56 having normally open contacts 57 and normally closed contacts 58, and the relay 59 being similarly provided with normally open contacts 60 and normally closed contacts 61. The section of the third rail G designated 32ᶜ disposed adjacent to the track connecting the right hand end of the siding 31 with the main track 34 is connected with a relay 64 provided with normally open contacts 65 and normally closed contacts 66. The third rail K is divided into sections corresponding to those described for the third rail G and the sections corresponding to the sections 32ª, 32ᵇ and 32ᶜ are connected with contacts 43, 49 and 51 of relays 42, 48 and 50, which contacts are normally open. The sections of third rail K corresponding to the sections 33 and 33ª of the third rail G are connected respectively with contacts 45 and 47 of relays 44 and 46 which contacts are normally open.

As indicated diagrammatically, the contacts closed by the contactors 39ª, 39ᵇ and 39ᶜ, mechanically actuated by the selector pins carried by the truck, are connected together in series as a result of which all of the contactors must be actuated in order to close the circuit controlled by them. The relation of the contactors to the selector pins carried by the truck is indicated in diagrammatic plan view in Fig. 13 for a track lay-out corresponding to that shown in Fig. 12 and illustrates clearly the many combinations that may be made by selecting the nine contactors, three at a time. Whatever may be the number of contactors actuated at the same time in any system to operate a switch, it will be understood that these contactors are connected together substantially as shown in Fig. 12, so that all of said contactors must be operated in order to close the circuit controlled by them and actuate the switching mechanism.

It is to be borne in mind that a truck in passing over any section of the track, grounds the corresponding section of the third rail G as a result of the connections above described in connection with Fig. 11, and it will therefore be necessary in Fig. 12 to follow the circuits from the positive side of the source of current only to the third rail G for such of the circuits as may be controlled thereby. Assume, now, that a truck approaches the section 33 of the track from the left. The selector pins $E^1$, $E^2$ and $E^3$, shown in Fig. 13, having been depressed as above described, the cam mechanism of the contactors 39ª, 39ᵇ and 39ᶜ is actuated, these contactors being located somewhat to the left of the section 33 to permit the switching mechanism to operate before the truck reaches the switch 30. As a result of the simultaneous depression of the contactor cams, the contacts 101, 102 and 103 of said contactors are closed, establishing the following circuit: positive side of the source, retaining winding 106, contact 103, retaining winding 105, contact 102, retaining winding 104, contact 101, wire 107, switch solenoid 40, wire 108, contacts 54 to ground and thus back to the source. As a result of the circuit traced the solenoid 40 is energized and the switch 30 actuated to open the main track and direct the truck to the siding 31. This condition of the solenoid 40 is maintained as a result of the operation of the locking windings 104, 105 and 106 until the circuit is subsequently broken as will be described. The energization of the solenoid 40 closes the contacts 41, completing the following circuit: positive side of source of current, winding 106, contact 103, winding 105, contact 102, winding 104, contact 101, wire 107, contacts 41, wire 109, contacts 55, wire 110, winding 44 to ground. This energizes winding 44, closing the contacts 45 and connects positive side of the source to the section 33 of the third rail K. This supplies current to the motor of the truck through the circuits above traced in connection with Fig. 11 and the truck moves from the switch to the section 32ª of the siding. At the same time that the truck enters the section 33 of the main track before entering the switch, section 33 of the third rail G is grounded by the truck thus energizing the relay 56 over the following circuit: positive side of the source, winding of relay 56, wire 111, third rail G to ground. As a result, the contacts 57 are closed and the contacts 58 are opened, which produces no change in the circuit connections as far as the siding 31 and the associated track is concerned, but the opening of the contacts 58 prevents the energization of the next section of track to the left of that shown in Fig. 12 in the same manner that the operation of the corresponding relay associated with the siding 36 prevents the energization of the main track section 33$^a$ and the siding section 33$^b$ in a manner to be described. When the truck enters the section 32$^a$ of the siding, the relay 52 is energized over the following circuit: positive side of source, winding of relay 52, wire 112, section 32$^a$ of third rail G to ground. As a result the contacts 53 are closed, which closes the following circuit through the relay 42: positive side of source, contacts 63, wire 113, contacts 53, wire 114, winding of relay 42 to ground. This closes the contacts 43, connecting positive side of source with the section 32$^a$ of third rail K through wire 115. The energization of relay 52 also opens the locking circuit of the contactors 39$^a$, 39$^b$, and 39$^c$, since by said energization of the relay 52 the contacts 54 are opened. The energization of the relay 52 also opens the contacts 55, thus opening the energizing circuit of the relay 44 already traced, which, by the opening of the contacts 45, deprives the section 33 of the third rail K along the main track of its current supply, thus preventing the supplying of current to said section through the subsequent simultaneous actuation of the contactors 39$^a$, 39$^b$ and 39$^c$, as long as the truck is on the section 32$^a$. The opening of the circuit through the solenoid 40 permits the switch 30 to return to its position causing a truck approaching from the left to move on the straight track 34 instead of upon the siding 31. As a result of supplying the truck motor with current when on the section 32$^a$ of the siding, it advances onto the section 32$^b$ of the siding, which results in energizing the relay 62 over the following circuit: positive side of source, winding of relay 62, wire 116, section 32$^b$ of third rail G to ground. As a result the contacts 63 are opened and the energizing circuit of the relay 42 is opened, thus depriving the section 32$^a$ of the siding of current supply by the opening of the contacts 43, as long as the truck is upon the section 32$^b$ of the siding.

When it is desired to move the truck from the section 32$^b$ of the siding the switch 69 is closed manually, in which position it is retained by the latch 68, closing the following circuit: positive side of source, contacts 58$^a$, wire 117, wire 118, contacts 67, wire 119, winding of relay 48, switch 69 to ground. As a result the contacts 49 are closed and the section 32$^b$ of the third rail K is supplied with current from the positive side of source through wire 120. When the car moves onto the section 32$^c$ of the siding the winding 67' is energized by current flowing from the positive side of the source through said winding to wire 121 to section 32$^c$ of third rail G and this results in withdrawing the latch 68 from engagement with the switch 69, whereupon said switch opens under the action of the spring 122. The presence of the truck on the section 32$^c$ also energizes the relay 64 through the following circuit: positive side of the source, winding of relay 62, wire 123, winding of relay 64, wire 124, wire 121, to section 32$^c$ of third rail G and thus to ground. This maintains the relay 62 in energized condition and the energization of the relay 64 opens the contacts 66 and closes the contacts 65. The closure of the contacts 65 energizes the relay 50 over the following circuit: positive side of the source, contacts 58$^a$, wire 117, wire 118, contacts 67, wire 125, contacts 65, wire 126, winding of relay 50 to ground, thus closing contacts 51, which results in supplying current from the positive side of source through the wire 127 to the section 32$^c$ of third rail K of the siding. The truck then proceeds from the siding to the main track and may continue on the main track or again be caused to enter a siding as desired, the operation of entering each siding being similar to that just described.

When the truck enters the section 33 of the main track without having its selector pins set in such a manner as to simultaneously operate the contactors 39$^a$, 39$^b$ and 39$^c$, the relay 56 is operated as above described through the section of the third rail G, opening the contacts 58, which are similar to the contacts 58$^a$ and similarly operated and exercise the same control over the preceding section to the left, not shown, as the contacts 58$^a$ exercise over the sections of the siding 31 and track adjacent thereto. It will be observed that when the contacts 58$^a$ are open it is impossible to close the energizing circuit through the relays 46, 48 and 50, which means that when a truck is on the section 38, which connects with the siding 36 as shown in Fig. 12, the section 33$^a$ of the main track and the sections 32$^b$ and 32$^c$ are deprived of operating current and that for this condition it is impossible to start a truck from the section 32$^b$ by operation of the switch 69. This follows from the circuits above traced for the relays 48 and 50, the circuits of the relay 46 being controlled as follows: When the truck passes on the main track from the section 33 to the section 33$^a$, the relay 59 is energized over the following circuit: positive side of the source, winding of relay 59, wire 128, section 33$^a$ of third rail G to ground, which results in closing the contacts 60 and opening the contacts 61. The closure of the contacts 60 closes the energizing circuit of the relay 46 as follows: positive side of the source, contacts 58$^a$, wire 117, contacts 66, wire 129, contacts 60, wire 130, winding of relay 46 to ground, which closes the contacts 47 and supplies the section 33ª of the third rail K with current from the positive side of the source through wire 131.

When the truck enters the section 33 of the main track without simultaneous operation of the contactors 39ª, 39ᵇ and 39ᶜ, the energization of the relay 56 described, by the closure of the contacts 57 closes the energizing circuit of the relay 44 over the following path: Positive side of the source, contacts 61, wire 132, contacts 57, wire 110, energizing winding of relay 44 to ground, as a result of which the contacts 45 are closed and positive current is supplied from the source through the wire 133 to the section 33 of the third rail K.

It will be observed that the normally open contacts of the relays 52, 56, 59 and 64 serve by their closure to energize relays 42, 44, 46 and 50 respectively, and that the normally closed contacts 54, 55, 58, 61 and 66 serve as blocking contacts since any of said contacts by being opened, as a result of the operation of the corresponding relay, serve to prevent the energization of the relays whose circuits extend through them, that is to say, when a truck is on either the section 32 of the siding or the section 33, of the straight track, the section of straight track to the left and the first two right hand sections of the siding to the left are blocked by the opening of the contacts 58; when a truck is on the section 32ª of the siding the section 32 of the siding and the section 33 of the straight track are blocked by the opening of the contacts 55 and operation of the switch solenoid is prevented by the opening of the contacts 54; when a truck is on the section 33ª of the straight track, if the switch 30 is not operated the section 33 of the straight track is blocked by the opening of contacts 61; when a truck is on section 32ᵇ of the siding the section 32ª of the siding is blocked by the opening of contacts 63; when a truck is on section 32ᶜ of the siding the section 33ª of the straight track and the section 32ª of the siding are blocked and the section 32ᵇ is prevented from receiving current excepting during the intervals when the switch 69 is manually held in closed position, since the retaining latch is rendered inoperative by the presence of a truck on the section 32ᶜ; and when a truck is on section 33ª of the main track the section 32ᵇ of the siding is blocked by the opening of the contacts 67.

The sequence of releasing operations of the several sections when they are blocked is as follows, assuming the most complicated case that can arise: Assume that a truck is on each of the sections 38, 32ᵇ, 33ª and 33. The truck on the section 38, by the energization of the relay 56ª prevents supplying motor current to the sections 32ᵇ and 33ª. The truck on the section 33ª by the energization of the relay 59 prevents supplying motor current to the section 33 and when the relay 56ª is deënergized the operation of the relay 46 prevents supplying motor current to the section 32ᵇ. The truck on the section 32ᵇ, through the energization of the relay 62, prevents supplying motor current to the section 32ª. When the truck on the section 38 passes to the section 38ª, the relay 56ª is deënergized and no longer interferes with supplying motor current to the sections 33ª and 32ᵇ. As a result, since the relay 46 now prevents supplying current to the section 32ᵇ, the truck on section 33ª moves to the section 38, thus maintaining the section 32ᵇ in blocked condition, since current is being supplied to the section 33ª to move the truck thereon to the section 38. The section 32ᵇ is still blocked and the section 33ª is again blocked which condition continues until the second truck passes to the right from section 38 onto section 38ª. For this condition the truck on the section 33 may pass to the section 33ª or the truck on the section 32ᵇ may pass to the section 32ᶜ and, if the latter is the case, the section 32ª is blocked until the truck entering the straight track from the section 32ᶜ has passed from the section 38 onto the section 38ª.

For the reasons pointed out, the blocking of the section 33, which occurs as a result of the presence of a truck on the section 33ª and the resultant energization of the relay 59 does not prevent the supply of motor current to the section 33 if the solenoid 40 is operated, for by this operation the switch 30 is thrown so as to divert the approaching truck to the siding, and no trouble can result from the truck approaching from the left entering the section 33 under these conditions. When the truck has entered the siding, however, and passed onto the section 32ª, the circuits controlled by the solenoid 40 are released, the switch is returned to its position opening the straight track and the section 33 is again blocked, assuming that the other truck still remains on the section 33ª. Furthermore, the solenoid 40 is rendered inoperative as above described when the truck is on the section 32ª of the siding. Consequently, another car can pass onto the block, 33ª, only in case it opens the switch, 30. That is, if the sections, 32ª and 32ᵇ, are each occupied by a truck, another truck approaching the switch, 30, cannot throw it but will pass along on the main track as though it were not intended for the siding, 31. This arrangement is made so that traffic on the main track will not be delayed by a truck awaiting entrance to a siding. It must be noted, however, that the sidings can be constructed to accommodate any number of trucks, the arrangement just described being one of detail which can be changed by changing connections. For instance, if a truck passes a switch which controls an occupied siding, the truck must then circle the tracks before it can enter the siding. In other words, the trucks are all intended to operate in one direction and after having passed a designated switch, must circle the tracks before entering such designated siding.

The above explanation is purposely given of cases more complicated than will ordinarily arise in order to show how the working of this system fulfils the demands of the conditions for which it is intended. There is absolutely no delay on the main tracks, nor is there any danger of collision and there is no need whatever at any point for manual labor to handle the trucks other than that needed to set the selector pins to the proper combination of the switch to which the truck is destined. This system can be extended to apply to any number of tracks and sidings and can be made a means of communication between similar tracks of different buildings.

We recognize the facts that trucks, somewhat similar in general design to the ones described in this specification, moved manually, moved electrically but controlled manually, or moved by means of internal combustion engines but controlled manually, are now in use in the United States; that manually operated trucks with removable tops and equipped with rollers that permit the loaded or empty top to move on or off the truck longitudinally, are also in use in the United States; and that a large part of the apparatus and machinery mentioned herein is in universal use but

We claim:

In a transportation system, a main track and a plurality of sidings, a car and an electric motor for moving the same, said track and sidings being suitably electrically connected and divided into sections forming blocks, the electrical circuit for one section in each siding being normally open when the car is on said section, means for interrupting the supply of electric power to one section when said car occupies the next forward section, and manually controlled means for closing the power circuit in said normally open circuit, substantially as described.

ROBERT CARLETON WELLER.
PHILIP DANIEL NAUGLE.
STANLEY TABER HYDE.

Witnesses for Robert Carleton Weller:
ARNOLD R. GILCHRIST,
W. A. MOORE.

Witnesses for Philip Daniel Naugle and Stanley Taber Hyde:
J. L. BERRY,
G. C. JONES.

Copies of this patent may be obtained for five cents each, by addressing the "Commissioner of Patents, Washington, D C."